(12) United States Patent
Zhu

(10) Patent No.: US 8,273,448 B2
(45) Date of Patent: *Sep. 25, 2012

(54) REINFORCED SILICONE RESIN FILMS

(75) Inventor: Bizhong Zhu, Midland, MI (US)

(73) Assignee: Dow Corning Corporation, Midlan, MI (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/527,629

(22) PCT Filed: Jan. 31, 2008

(86) PCT No.: PCT/US2008/001313
§ 371 (c)(1),
(2), (4) Date: Aug. 18, 2009

(87) PCT Pub. No.: WO2008/103226
PCT Pub. Date: Aug. 28, 2008

(65) Prior Publication Data
US 2010/0028643 A1    Feb. 4, 2010

Related U.S. Application Data

(60) Provisional application No. 60/902,806, filed on Feb. 22, 2007.

(51) Int. Cl.
  B32B 7/02      (2006.01)
  B32B 27/06     (2006.01)
(52) U.S. Cl. ......... 428/216; 428/215; 428/323; 428/447
(58) Field of Classification Search .................. 428/215, 428/216, 323, 447
  See application file for complete search history.

(56) References Cited

U.S. PATENT DOCUMENTS

| | | |
|---|---|---|
| 736,971 A | 8/1903 | Jenkins |
| 2,702,764 A | 2/1955 | Painter et al. |
| 2,915,475 A | 12/1959 | Bugosh |
| 3,031,417 A | 4/1962 | Bruce |
| 3,419,593 A | 12/1968 | Willing |
| 3,445,420 A | 5/1969 | Kookootsedes et al. |
| 4,087,585 A | 5/1978 | Schulz |
| 4,260,780 A | 4/1981 | West |
| 4,273,697 A | 6/1981 | Sumimura et al. |
| 4,276,424 A | 6/1981 | Peterson, Jr. et al. |
| 4,314,956 A | 2/1982 | Baney et al. |
| 4,324,901 A | 4/1982 | West et al. |
| 4,332,525 A | 6/1982 | Cheney, Jr. |
| 4,395,443 A | 7/1983 | Shimizu et al. |
| 4,460,638 A | 7/1984 | Haluska |
| 4,460,639 A | 7/1984 | Chi et al. |
| 4,460,640 A | 7/1984 | Chi et al. |
| 4,500,447 A | 2/1985 | Kobayashi et al. |
| 4,510,094 A | 4/1985 | Drahnak et al. |
| 4,530,879 A | 7/1985 | Drahnak et al. |
| 4,537,829 A | 8/1985 | Blizzard et al. |
| 4,568,566 A | 2/1986 | Tolentino |
| 4,572,814 A | 2/1986 | Naylor et al. |
| 4,618,666 A | 10/1986 | Port |
| 4,761,454 A | 8/1988 | Oba et al. |
| 4,766,176 A | 8/1988 | Lee et al. |
| 4,898,689 A | 2/1990 | Hamada et al. |
| 4,916,169 A | 4/1990 | Boardman et al. |
| 4,952,658 A | 8/1990 | Kalchauer et al. |
| 5,017,654 A | 5/1991 | Togashi et al. |
| 5,135,980 A | 8/1992 | Watanabe |
| 5,166,287 A | 11/1992 | Kalchauer et al. |
| 5,194,649 A | 3/1993 | Okawa |
| 5,213,868 A | 5/1993 | Liberty et al. |
| 5,256,480 A | 10/1993 | Inoue et al. |
| 5,278,272 A | 1/1994 | Lai et al. |
| 5,281,455 A | 1/1994 | Braun et al. |
| 5,283,309 A | 2/1994 | Morita |
| 5,310,843 A | 5/1994 | Morita |
| 5,312,946 A | 5/1994 | Stank et al. |
| 5,319,051 A | 6/1994 | Tabei et al. |
| 5,358,983 A | 10/1994 | Morita |
| 5,371,139 A | 12/1994 | Yokoyama et al. |
| 5,468,826 A | 11/1995 | Gentle et al. |
| 5,468,827 A | 11/1995 | Morita |
| 5,474,608 A | 12/1995 | Beisswanger et al. |
| 5,486,588 A | 1/1996 | Morita |
| 5,496,961 A | 3/1996 | Dauth et al. |
| 5,527,578 A | 6/1996 | Mazurek et al. |
| 5,530,075 A | 6/1996 | Morita et al. |
| 5,580,915 A | 12/1996 | Lin |
| 5,581,008 A | 12/1996 | Kobayashi |
| 5,585,147 A | 12/1996 | Ogawa et al. |
| 5,738,976 A | 4/1998 | Okinoshima et al. |
| 5,747,608 A | 5/1998 | Katsoulis et al. |
| 5,794,649 A | 8/1998 | Spear et al. |
| 5,801,262 A | 9/1998 | Adams |
| 5,824,761 A | 10/1998 | Bujanowski et al. |
| 5,830,950 A | 11/1998 | Katsoulis et al. |
| 5,861,467 A | 1/1999 | Bujanowski et al. |
| 5,904,796 A | 5/1999 | Freuler et al. |
| 5,959,038 A | 9/1999 | Furukawa et al. |
| 5,972,512 A | 10/1999 | Boisvert et al. |
| 6,046,283 A | 4/2000 | Katsoulis et al. |

(Continued)

FOREIGN PATENT DOCUMENTS

CN    1528000 A    9/2004

(Continued)

OTHER PUBLICATIONS

"Novel synthesis of aluminium oxide nanofibers," Materials Research Society Symposium Proceedings, vol. 703, Nov. 26-29, 2001. Abstract only.

(Continued)

Primary Examiner — D. S. Nakarani
(74) Attorney, Agent, or Firm — Howard & Howard Attorneys PLLC

(57) ABSTRACT

Reinforced silicone resin films comprising at least two polymer layers, wherein at least one of the polymer layers comprises a cured product of a at least one silicone resin having an average of at least two silicon-bonded hydrogen atoms, hydroxyl groups, or hydrolysable groups per molecule, and at least one of the polymer layers comprises a carbon nanomaterial.

13 Claims, 2 Drawing Sheets

U.S. PATENT DOCUMENTS

| | | |
|---|---|---|
| 6,194,063 B1 | 2/2001 | Oura et al. |
| 6,204,301 B1 | 3/2001 | Oshima et al. |
| 6,287,639 B1 | 9/2001 | Schmidt et al. |
| 6,297,305 B1 | 10/2001 | Nakata et al. |
| 6,310,146 B1 | 10/2001 | Katsoulis et al. |
| 6,352,610 B1 | 3/2002 | Schmidt et al. |
| 6,368,535 B1 | 4/2002 | Katsoulis et al. |
| 6,376,078 B1 | 4/2002 | Inokuchi |
| 6,378,599 B1 | 4/2002 | Schmidt et al. |
| 6,387,487 B1 | 5/2002 | Greenberg et al. |
| 6,407,922 B1 | 6/2002 | Eckland et al. |
| 6,432,497 B2 | 8/2002 | Bunyan |
| 6,451,869 B1 | 9/2002 | Butts |
| 6,617,674 B2 | 9/2003 | Becker et al. |
| 6,644,395 B1 | 11/2003 | Bergin |
| 6,652,958 B2 | 11/2003 | Tobita |
| 6,656,425 B1 | 12/2003 | Benthien et al. |
| 6,660,395 B2 | 12/2003 | McGarry et al. |
| 6,689,859 B2 | 2/2004 | Li et al. |
| 6,730,731 B2 | 5/2004 | Tobita et al. |
| 6,783,692 B2 | 8/2004 | Bhagwagar |
| 6,791,839 B2 | 9/2004 | Bhagwagar |
| 6,831,145 B2 | 12/2004 | Kleyer et al. |
| 6,838,005 B2 | 1/2005 | Tepper et al. |
| 6,841,213 B2 | 1/2005 | Parsonage et al. |
| 6,884,314 B2 | 4/2005 | Cross et al. |
| 6,902,688 B2 | 6/2005 | Narayan et al. |
| 6,908,682 B2 | 6/2005 | Mistele |
| 7,029,603 B2 | 4/2006 | Wang et al. |
| 7,037,592 B2 | 5/2006 | Zhu et al. |
| 7,074,481 B2 | 7/2006 | Watson |
| 7,132,062 B1 | 11/2006 | Howard |
| 7,147,367 B2 | 12/2006 | Balian et al. |
| 7,163,720 B1 | 1/2007 | Dhaler et al. |
| 7,253,442 B2 | 8/2007 | Huang et al. |
| 7,311,967 B2 | 12/2007 | Dani et al. |
| 7,339,012 B2 | 3/2008 | Prasse |
| 7,381,470 B2 | 6/2008 | Suto et al. |
| 7,459,192 B2 | 12/2008 | Parsonage et al. |
| 7,563,515 B2 | 7/2009 | Ekeland et al. |
| 7,622,159 B2 | 11/2009 | Mertz et al. |
| 7,658,983 B2 | 2/2010 | Mormont et al. |
| 7,799,842 B2 | 9/2010 | Anderson et al. |
| 7,850,870 B2 | 12/2010 | Ahn et al. |
| 2003/0047718 A1 | 3/2003 | Narayan et al. |
| 2003/0054162 A1 | 3/2003 | Watson |
| 2003/0077478 A1 | 4/2003 | Dani et al. |
| 2003/0096104 A1 | 5/2003 | Tobita et al. |
| 2003/0170418 A1 | 9/2003 | Mormont et al. |
| 2003/0175533 A1 | 9/2003 | McGarry et al. |
| 2003/0213939 A1 | 11/2003 | Narayan et al. |
| 2004/0053059 A1 | 3/2004 | Mistele |
| 2004/0089851 A1 | 5/2004 | Wang et al. |
| 2004/0101679 A1 | 5/2004 | Mertz et al. |
| 2004/0126526 A1 | 7/2004 | Parsonage et al. |
| 2004/0166332 A1 | 8/2004 | Zhu et al. |
| 2005/0059754 A1 | 3/2005 | Lunt et al. |
| 2005/0113749 A1 | 5/2005 | Parsonage et al. |
| 2005/0227091 A1 | 10/2005 | Suto et al. |
| 2005/0281997 A1 | 12/2005 | Grah |
| 2007/0020468 A1 | 1/2007 | Ekeland et al. |
| 2007/0120100 A1 | 5/2007 | Glatkowski et al. |
| 2007/0246245 A1 | 10/2007 | Ahn et al. |
| 2008/0051548 A1 | 2/2008 | Bailey et al. |
| 2008/0115827 A1 | 5/2008 | Woods et al. |
| 2008/0138525 A1 | 6/2008 | Bailey et al. |
| 2009/0005499 A1 | 1/2009 | Fisher et al. |
| 2009/0090413 A1 | 4/2009 | Katsoulis et al. |
| 2009/0105362 A1 | 4/2009 | Anderson et al. |
| 2009/0155577 A1 | 6/2009 | Anderson et al. |
| 2009/0246499 A1 | 10/2009 | Katsoulis et al. |
| 2010/0028643 A1 | 2/2010 | Zhu |
| 2010/0062247 A1 | 3/2010 | Fisher et al. |
| 2010/0068538 A1 | 3/2010 | Fisher |
| 2010/0075127 A1 | 3/2010 | Fisher et al. |
| 2010/0086760 A1 | 4/2010 | Zhu |
| 2010/0087581 A1 | 4/2010 | Fisher et al. |
| 2010/0112321 A1 | 5/2010 | Zhu |
| 2010/0129625 A1 | 5/2010 | Zhu |
| 2010/0143686 A1 | 6/2010 | Zhu |
| 2010/0209687 A1 | 8/2010 | Zhu |
| 2010/0233379 A1 | 9/2010 | Fisher et al. |
| 2010/0280172 A1 | 11/2010 | Zhu |

FOREIGN PATENT DOCUMENTS

| | | |
|---|---|---|
| CN | 1558931 A | 12/2004 |
| CN | 1676568 A | 10/2005 |
| DE | 19647368 | 5/1998 |
| DE | 19915378 A1 | 10/2000 |
| DE | 4033157 | 9/2003 |
| EP | 0126535 A1 | 11/1984 |
| EP | 0358452 A2 | 3/1990 |
| EP | 0480680 A1 | 4/1992 |
| EP | 0566311 A2 | 10/1993 |
| EP | 0562922 B1 | 5/1997 |
| EP | 0850998 A2 | 7/1998 |
| EP | 0936250 A2 | 8/1999 |
| EP | 1050538 A2 | 11/2000 |
| EP | 1065248 A2 | 1/2001 |
| EP | 1454962 A1 | 9/2004 |
| EP | 1391492 B1 | 6/2006 |
| FR | 2564470 A1 | 11/1985 |
| GB | 736971 | 9/1955 |
| JP | 47-27300 A | 10/1972 |
| JP | 53-118470 A | 10/1978 |
| JP | 59-025742 A | 2/1984 |
| JP | 59-096122 | 6/1984 |
| JP | 59-199547 A | 11/1984 |
| JP | 62-003947 | 1/1987 |
| JP | 02-058587 A | 2/1990 |
| JP | 08-027381 A | 1/1996 |
| JP | 08-037418 A | 2/1996 |
| JP | 09-064391 A | 3/1997 |
| JP | 10-001549 | 1/1998 |
| JP | 10-212410 A | 8/1998 |
| JP | 2000-119526 A | 4/2000 |
| JP | 2000-195337 A | 7/2000 |
| JP | 2001-291431 A | 10/2001 |
| JP | 2004-002653 A | 1/2004 |
| JP | 2004-339427 A | 12/2004 |
| JP | 2005-520020 A | 7/2005 |
| JP | 2007-90817 A | 4/2007 |
| JP | 2008-530339 A | 8/2008 |
| TW | 2004/18964 A | 10/2004 |
| WO | 94/17003 A1 | 8/1994 |
| WO | 02/082468 A1 | 10/2002 |
| WO | 02/085612 A2 | 10/2002 |
| WO | 03/078079 A1 | 9/2003 |
| WO | 03/099828 A1 | 12/2003 |
| WO | 03104329 A1 | 12/2003 |
| WO | 2004/035661 A1 | 4/2004 |
| WO | 2004/060472 A1 | 7/2004 |
| WO | 2004106175 A1 | 9/2004 |
| WO | 2004/106420 A2 | 12/2004 |
| WO | WO 2005/114324 A2 | 12/2005 |
| WO | WO 2006/088645 A1 | 8/2006 |
| WO | WO 2006/088646 A1 | 8/2006 |
| WO | WO 2007-013135 | 2/2007 |
| WO | WO 2007-018756 | 2/2007 |
| WO | WO 2007/018756 A1 | 2/2007 |
| WO | WO 2007-092118 | 8/2007 |
| WO | WO 2007/092118 A2 | 8/2007 |
| WO | WO 2007/097835 A2 | 8/2007 |
| WO | WO 2007-121006 | 10/2007 |
| WO | WO 2007-123901 | 11/2007 |
| WO | 2008/013612 A1 | 1/2008 |
| WO | WO 2008-013611 | 1/2008 |
| WO | WO 2008-045104 | 4/2008 |
| WO | WO 2008-051242 | 5/2008 |
| WO | WO 2009-007786 | 1/2009 |

OTHER PUBLICATIONS

Frogley, Mark D. et. al., "Mechanical properties of carbon nanoparticle-reinforced elastomers", Composites Science and Technology, 2003, pp. 1647-1654, vol. 63, Elsevier Ltd.

Reese, Herschel, et. al., "Development of Silicone Substrates to be Used with CIGS Deposition," Air Force Office of Scientific Research, 2005, pp. 1-62, Arlington, Virginia.

English language abstract of JP 59-096122 extracted from espacenet.com database dated Aug. 26, 2011; 1 page.

English language abstract of FR 2564470 extracted from espacenet.com database dated Oct. 12, 2010; 2 pages.

English language abstract of DE 19647368 extracted from espacenet.com database dated Aug. 26, 2011; 1 page.

English language abstract of DE 19915378 extracted from espacenet.com database dated Aug. 26, 2011; 1 page.

English language abstract of DE 4033157 extracted from espacenet.com database dated Aug. 26, 2011; 1 page.

English language abstract of CN 1528000 extracted from espacenet.com database dated Sep. 23, 2010; 1 page.

English language abstract of TW 2004/18964 dated Sep. 23, 2010; 3 pages.

English language translation and abstract for JP 2004-339427 extracted from PAJ database, dated Oct. 15, 2010, 51 pages.

English language abstract of CN 1558931 extracted from espacenet.com database dated Aug. 26, 2011; 1 page.

English language abstract of CN 1676568 extracted from espacenet.com database dated Mar. 1, 2011; 1 page.

Guo, Andrew, et al., "Highly Active Visible-Light Photocatalysts for Curing a Ceramic Precursor," Chemical Materials, 1998, pp. 531-536, vol. 10, American Chemical Society.

Partial English Translation for JP62-003947, dated Nov. 15, 2011, 2 pages.

English language abstract of JP 02-058587 extracted from espacenet.com database dated Nov. 15, 2011; 1 page.

English language abstract of JP 2000-119526 extracted from espacenet.com database dated Nov. 15, 2011; 1 page.

English language abstract of JP 53-118470 extracted from espacenet.com database dated Nov. 15, 2011; 1 page.

English language abstract of JP 2000-195337 extracted from espacenet.com database dated Nov. 14, 2011; 1 page.

English Language abstract of JP 2004-002653 extracted from espacenet.com database dated Nov. 14, 2011; 1 page.

English Language abstract of JP 2001-291431 extracted from espacenet.com database dated Nov. 14, 2011; 1 page.

English Language abstract of JP 9-64391 extracted from espacenet.com database dated Nov. 14, 2011; 1 page.

English Language abstract of JP 8-37418 extracted from espacenet.com database dated Nov. 14, 2011; 1 page.

English Language abstract of JP 8-27381 extracted from espacenet.com database dated Nov. 14, 2011; 1 page.

REINFORCED SILICONE RESIN FILMS

CROSS REFERENCE TO RELATED APPLICATIONS

This application is a U.S. national stage filing under 35 U.S.C. §371 of PCT Application No. PCT/US08/001313 filed on Jan. 31, 2008, currently pending, which claims the benefit of U.S. Provisional Patent Application No. 60/902,806 filed Feb. 22, 2007 under 35 U.S.C. §119 (e). PCT Application No. PCT/US08/001313 and U.S. Provisional Patent Application No. 60/902,806 are hereby incorporated by reference.

FIELD OF THE INVENTION

The present invention relates to reinforced silicone resin films and more particularly to reinforced silicone resin films comprising at least two polymer layers, wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a reinforced silicone resin film consisting essentially of:
a first polymer layer; and
a second polymer layer on the first polymer layer; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

The present invention is also directed to a reinforced silicone resin film comprising:
a first polymer layer;
a second polymer layer on the first polymer layer; and
at least one additional polymer layer on the second polymer layer; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial.

The reinforced silicone resin films of the present invention have low coefficient of thermal expansion, and exhibit high resistance to thermally induced cracking.

The reinforced silicone resin films of the present invention are useful in applications requiring films having high thermal stability, flexibility, mechanical strength, and transparency. For example, the silicone resin films can be used as integral components of flexible displays, solar cells, flexible electronic boards, touch screens, fire-resistant wallpaper, and impact-resistant windows. The films are also suitable substrates for transparent or nontransparent electrodes.

Figure 1:
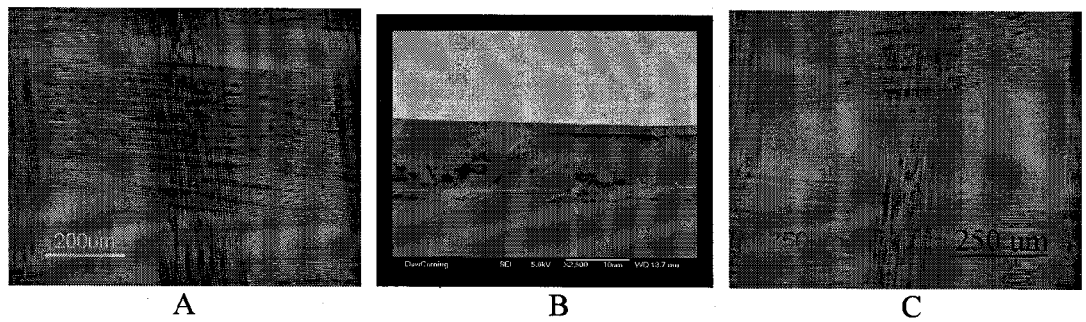
FIG. 1A is a plan view (i.e., top view) photomicrograph of the reinforced silicone resin film of Example 3 before heat treatment.
FIG. 1B is a cross-sectional view photomicrograph of the reinforced silicone resin film of Example 3 before heat treatment.
FIG. 1C is a plan view photomicrograph of the reinforced silicone resin film of Example 3 after heat treatment.

In the Drawings only, the symbol um represents micron.

DETAILED DESCRIPTION OF THE INVENTION

As used herein, the term "mol % of the groups $R^2$ in the silicone resin are hydrogen, hydroxy, or a hydroslysable group" is defined as the ratio of the number of moles of silicon-bonded hydrogen, hydroxy, or hydroslysable groups in the silicone resin to the total number of moles of the groups $R^2$ in the resin, multiplied by 100. Further, the term "mol % of the groups $R^4$ in the silicone resin are hydroxy or hydrolysable groups" is defined as the ratio of the number of moles of silicon-bonded hydroxy or hydrolysable groups in the silicone resin to the total number of moles of the groups $R^4$ in the resin, multiplied by 100.

A first reinforced silicone resin film according to the present invention consists essentially of:
a first polymer layer; and
a second polymer layer on the first polymer layer; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

The first polymer layer of the first reinforced silicone resin film typically has a thickness of from 0.01 to 1000 μm, alternatively from 5 to 500 μm, alternatively from 10 to 100 μm.

The first polymer layer of the first reinforced silicone resin film can comprise a thermoplastic polymer or a thermoset polymer. The thermoplastic or thermoset polymer can be a homopolymer or a copolymer. Moreover, the thermoplastic or thermoset polymer can be a silicone polymer or an organic polymer. As used herein and below, the term "thermoplastic polymer" refers to a polymer that has the property of converting to a fluid (flowable) state when heated and of becoming rigid (nonflowable) when cooled. Also, the term "thermoset polymer" refers to a cured (i.e., cross-linked) polymer that does not convert to a fluid state on heating.

Examples of thermoplastic polymers include, but are not limited to thermoplastic silicone polymers such as poly (diphenylsiloxane-co-phenylmethylsiloxane); and thermoplastic organic polymers such as polyolefins, polysulfones, polyacrylates and polyetherimides.

Examples of thermoset polymers include, but are not limited to, thermoset silicone polymers such as cured silicone elastomers, silicone gels, and cured silicone resins; and thermoset organic polymers such as epoxy resins, cured amino resins, cured polyurethanes, cured polyimides, cured phenolic resins, cured cyanate ester resins, cured bismaleimide resins, cured polyesters, and cured acrylic resins.

In addition to a thermoplastic or thermoset polymer, the first polymer layer of the first reinforced silicone resin film can comprise a reinforcement selected from a carbon nanomaterial, a fiber reinforcement, and a mixture thereof, each as described below.

The second polymer layer of the first reinforced silicone resin film is as described and exemplified above for the first polymer layer. The first and second polymer layers of the first reinforced silicone resin film differ in at least one of numerous physical and chemical properties, including thickness, polymer composition, cross-link density, and concentration of carbon nanomaterial or other reinforcement At least one of the polymer layers of the first reinforced silicone resin film comprises a cured product of at least one silicone resin having an average of at least two silicon-bonded hydrogen atoms, hydroxy groups, or hydrolysable groups per molecule. As used herein, the term "cured product of at least one silicone resin" refers to a cross-linked product of at least one silicone resin, the product having a three-dimensional network structure. The silicone resin, methods of preparing the resin, and methods of preparing the cured product of the silicone resin are described below in the method of preparing the first reinforced silicone resin film of the present invention.

At least one of the polymer layers of the first reinforced silicone resin film comprises a carbon nanomaterial. The carbon nanomaterial can be any carbon material having at least one physical dimension (e.g., particle diameter, fiber diameter, layer thickness) less than about 200 nm. Examples of carbon nanomaterials include, but are not limited to, carbon nanoparticles having three dimensions less than about 200 nm, such as quantum dots, hollow spheres, and fullerenes; fibrous carbon nanomaterials having two dimensions less than about 200 nm, such as nanotubes (e.g., single-walled nanotubes and multi-walled nanotubes) and nanofibers (e.g., axially aligned, platelet, and herringbone or fishbone nanofibers); and layered carbon nanomaterials having one dimension less than about 200 nm, such as carbon nanoplatelets (e.g., exfoliated graphite and graphene sheet). The carbon nanomaterial can be electrically conductive or semiconductive.

The carbon nanomaterial can also be an oxidized carbon nanomaterial, prepared by treating the aforementioned carbon nanomaterials with an oxidizing acid or mixture of acids at elevated temperature. For example, the carbon nanomaterial can be oxidized by heating the material in a mixture of concentrated nitric acid and concentrated sulfuric acid (1:3 v/v, 25 mL/g carbon) at a temperature of from 40 to 150° C. for 1-3 hours.

The carbon nanomaterial can be a single carbon nanomaterial or a mixture comprising at least two different carbon nanomaterials, each as described above.

The concentration of the carbon nanomaterial in the first and/or second polymer layer is typically from 0.0001 to 99% (w/w), alternatively from 0.001 to 50% (w/w), alternatively from 0.01 to 25% (w/w), alternatively from 0.1 to 10% (w/w), alternatively from 1 to 5% (w/w), based on the total weight of the polymer layer.

Methods of preparing carbon nanomaterials are well-known in the art. For example, carbon nanoparticles (e.g., fullerenes) and fibrous carbon nanomaterials (e.g., nanotubes, and nanofibers) can be prepared using at least one of the following methods: arc discharge, laser ablation, and catalytic chemical vapor deposition. In the arc discharge process, an arc discharge between two graphite rods produces, depending on the gas atmosphere, single-walled nanotubes, multi-walled nanotubes, and fullerenes. In the laser ablation method, a graphite target loaded with a metal catalyst is irradiated with a laser in a tube furnace to produce single- and multi-walled nanotubes. In the catalytic chemical vapor deposition method, a carbon-containing gas or gas mixture is introduced into a tube furnace containing a metal catalyst at a temperature of from 500 to 1000° C. (and different pressures) to produce carbon nanotubes and nanofibers. Carbon nanoplatelets can be prepared by the intercalation and exfoliation of graphite.

When both of the polymer layers of the first reinforced silicone resin film comprise a cured product of a silicone resin, then both of the polymer layers comprise a reinforcement selected from (i) a carbon nanomaterial, (ii) a fiber reinforcement, and (iii) a mixture comprising (i) and (ii). The carbon nanomaterial is as described and exemplified above. The polymer layers may each comprise the same or different reinforcement selected from (i), (ii), and (iii).

The fiber reinforcement can be any reinforcement comprising fibers, provided the reinforcement has a high modulus and high tensile strength. The fiber reinforcement typically has a Young's modulus at 25° C. of at least 3 GPa. For example, the reinforcement typically has a Young's modulus at 25° C. of from 3 to 1,000 GPa, alternatively from 3 to 200 GPa, alternatively from 10 to 100 GPa. Moreover, the reinforcement typically has a tensile strength at 25° C. of at least 50 MPa. For example, the reinforcement typically has a tensile strength at 25° C. of from 50 to 10,000 MPa, alternatively from 50 to 1,000 MPa, alternatively from 50 to 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from 1 to 100 µm, alternatively from 1 to 20 µm, alternatively form 1 to 10 µm. Loose fibers may be continuous, meaning the fibers extend throughout the reinforced silicone resin film in a generally unbroken manner, or chopped.

The fiber reinforcement is typically heat-treated prior to use to remove organic contaminants. For example, the fiber reinforcement is typically heated in air at an elevated temperature, for example, 575° C., for a suitable period of time, for example 2 h.

Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The concentration of the fiber reinforcement in the first and/or second polymer layer is typically from 0.1 to 95%

(w/w), alternatively from 5 to 75% (w/w), alternatively from 10 to 40% (w/w), based on the total weight of the polymer layer.

When one or both of the polymer layers of the first reinforced silicone resin film comprise a mixture of a carbon nanomaterial and a fiber reinforcement, the concentration of the mixture is typically from 0.1 to 96% (w/w), alternatively from 5 to 75% (w/w), alternatively from 10 to 40% (w/w), based on the total weight of the polymer layer.

The first polymer layer and the second polymer layer can be prepared as described below in the method of preparing the first reinforced silicone resin film of the present invention.

The first reinforced silicone resin film can be prepared by a method comprising:

forming a first polymer layer on a release liner; and forming a second polymer layer on the first polymer layer; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

In the first step of the method of preparing the first reinforced silicone resin film, a first polymer layer, described above, is formed on a release liner.

The release liner can be any rigid or flexible material having a surface from which the first polymer layer can be removed without damage. Examples of release liners include, but are not limited to, silicon, quartz; fused quartz; aluminum oxide; ceramics; glass; metal foils; polyolefins such as polyethylene, polypropylene, polystyrene, and polyethyleneterephthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones. The release liner can also be a material, as exemplified above, having a surface treated with a release agent, such as a silicone release agent.

The first polymer layer can be formed using a variety of methods, depending on the composition of the polymer layer. For example, when the first polymer layer comprises a thermoplastic polymer, the layer can by formed by (i) coating a release liner with a composition comprising a thermoplastic polymer in a fluid state and (ii) converting the thermoplastic polymer of the coated release liner to a solid state.

In step (i) of the preceding method of forming the first polymer layer, a release liner, described above, is coated with a composition comprising a thermoplastic polymer in fluid state.

The composition comprising a thermoplastic polymer can be any composition comprising a thermoplastic polymer in a fluid (i.e., liquid) state. As used herein, the term "thermoplastic polymer in a fluid state" means the polymer is in a molten state or dissolved in an organic solvent. For example, the composition can comprise a thermoplastic polymer in a molten state above the melting point ($T_m$) or glass transition temperature ($T_g$) of the polymer, or the composition can comprise a thermoplastic polymer and an organic solvent.

The thermoplastic polymer of the composition is as described and exemplified above for the first reinforced silicone resin film. The thermoplastic polymer can be a single thermoplastic polymer or a mixture (i.e., blend) comprising two or more different thermoplastic polymers. For example, the thermoplastic polymer can be a polyolefin blend.

The organic solvent can be any protic, aprotic, or dipolar aprotic organic solvent that does not react with the thermoplastic polymer and is miscible with the polymer. Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene; and alcohols such as methanol, ethanol, 1-propanol, 2-propanol, 1-butanol, 2-butanol, 2-methyl-1-butanol, 1,1-dimethyl-1-ethanol, pentanol, hexanol, cyclohexanol, hepatanol, and octanol.

The organic solvent can be a single organic solvent or a mixture comprising two or more different organic solvents, each as described and exemplified above.

The composition comprising the thermoplastic polymer can further comprise a carbon nanomaterial, described and exemplified above.

The release liner can be coated with the composition comprising a thermoplastic polymer in a fluid state using conventional coating techniques, such as spin coating, dipping, spraying, brushing, extrusion, or screen-printing. The amount of the composition is sufficient to form a first polymer layer having a thickness of from 0.01 to 1000 µm.

In step (ii) of the preceding method, the thermoplastic polymer of the coated release liner is converted to a solid state. When the composition used to coat the release liner comprises a thermoplastic polymer in a molten state, the thermoplastic polymer can be converted to a solid state by allowing the polymer to cool to a temperature below the liquid-solid transition temperature ($T_g$ or $T_m$), for example, room temperature. When the composition used to coat the release liner comprises a thermoplastic polymer and an organic solvent, the thermoplastic polymer can be converted to a solid state by removing at least a portion of the solvent. The organic solvent can be removed by allowing the solvent to evaporate at ambient temperature or by heating the coating to a moderate temperature, for example, below the solid-liquid transition temperature of the polymer.

The method of forming the first polymer layer, wherein the layer comprises a thermoplastic polymer, can further comprise, after step (i) and before step (ii), applying a second release liner to the coated release liner of the first step to form an assembly, and compressing the assembly. The assembly can be compressed to remove excess composition and/or entrapped air, and to reduce the thickness of the coating. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 200° c.

The method of forming the first polymer layer, wherein the layer comprises a thermoplastic polymer, can further comprise repeating the steps (i) and (ii) to increase the thickness of the polymer layer, provided the same composition is used for each coating step.

When the first polymer layer comprises a thermoset (i.e., cross-linked) polymer, the layer can be formed by (i) coating a release liner with a curable composition comprising a thermosetting polymer and (ii) curing the thermosetting polymer of the coated release liner.

In step (i) of the immediately preceding method of forming the first polymer layer, a release liner, described above, is coated with a curable composition comprising a thermosetting polymer.

The curable composition comprising a thermosetting polymer can be any curable composition containing a thermosetting polymer. As used herein and below, the term "thermosetting polymer" refers to a polymer having the property of becoming permanently rigid (nonflowable) when cured (i.e., cross-linked). The curable composition typically contains a thermosetting polymer and additional ingredients, such as an organic solvent, cross-linking agent, and/or catalyst.

Examples of curable compositions comprising thermosetting polymers include, but are not limited to, curable silicone compositions, such as hydrosilylation-curable silicone compositions, condensation-curable silicone compositions, and peroxide-curable silicone compositions; curable polyolefin compositions such as polyethylene and polypropylene compositions; curable polyamide compositions; curable epoxy resin compositions; curable amino resin compositions; curable polyurethane compositions; curable polyimide compositions; curable polyester compositions; and curable acrylic resin compositions.

The curable composition comprising a thermosetting polymer can also be a condensation-curable silicone composition comprising a silicone resin having an average of at least two silicon-bonded hydrogen atoms, hydroxy groups, or hydrolysable groups per molecule.

The condensation-curable silicone composition can be any condensation-curable silicone composition containing a silicone resin having an average of at least two silicon-bonded hydrogen atoms, hydroxy groups, or hydrolysable groups per molecule. Typically, the condensation-curable silicone composition comprises the aforementioned silicone resin and, optionally, a cross-linking agent having silicon-bonded hydrolysable groups and/or a condensation catalyst.

The silicone resin of the condensation-curable silicone composition is typically a copolymer containing T units, T and Q siloxane units, or T and/or Q siloxane units in combination with M and/or D siloxane units. Moreover, the silicone resin can be a rubber-modified silicone resin, described below for the second embodiment of the condensation-curable silicone composition.

According to a first embodiment, the condensation-curable silicone composition comprises a silicone resin having the formula $(R^1R^2{}_2SiO_{1/2})_w(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms, hydroxy groups, or hydrolysable groups per molecule.

The hydrocarbyl and halogen-substituted hydrocarbyl groups represented by $R^1$ typically have from 1 to 10 carbon atoms, alternatively from 1 to 6 carbon atoms, alternatively from 1 to 4 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

As used herein the term "hydrolysable group" means the silicon-bonded group reacts with water in either the presence or absence of a catalyst at any temperature from room temperature (~23±2° C.) to 100° C. within several minutes, for example thirty minutes, to form a silanol (Si—OH) group. Examples of hydrolysable groups represented by $R^2$ include, but are not limited to, —Cl, —Br, —OR³, —OCH₂CH₂OR³, CH₃C(=O)O—, Et(Me)C=N—O—, CH₃C(=O)N(CH₃)—, and —ONH₂, wherein $R^3$ is $C_1$ to $C_8$ hydrocarbyl or $C_1$ to $C_8$ halogen-substituted hydrocarbyl.

The hydrocarbyl and halogen-substituted hydrocarbyl groups represented by $R^3$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^3$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^3$ include, but are not limited to, 3,3,3-trifluoropropyl, 3-chloropropyl, chlorophenyl, and dichlorophenyl.

In the formula (I) of the silicone resin, the subscripts w, x, y, and z are mole fractions. The subscript w typically has a value of from 0 to 0.95, alternatively from 0.02 to 0.75, alternatively from 0.05 to 0.3; the subscript x typically has a value of from 0 to 0.95, alternatively from 0 to 0.7, alternatively from 0 to 0.25; the subscript y typically has a value of from 0 to 1, alternatively from 0.25 to 0.8, alternatively from 0.5 to 0.8; the subscript z typically has a value of from 0 to 0.95, alternatively from 0 to 0.7, alternatively from 0 to 0.15. Also, the sum y+z is typically from 0.05 to 1, alternatively from 0.5 to 0.95, alternatively from 0.65 to 0.9. Further, the sum w+x is typically from 0 to 0.95, alternatively from 0.05 to 0.5, alternatively from 0.1 to 0.35.

Typically, at least 1 mol %, alternatively at least 10 mol %, alternatively at least 50 mol % of the groups $R^2$ in the silicone resin are hydrogen, hydroxy, or a hydrolysable group.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin contains $R^2SiO_{3/2}$ units (i.e., T units), $R^2SiO_{3/2}$ units (i.e., T units) and $SiO_{4/2}$ units (i.e., Q units), or $R^2SiO_{3/2}$ units (i.e., T units) and/or $SiO_{4/2}$ units (i.e., Q units) in combination with $R^1R^2{}_2SiO_{1/2}$ units (i.e., M units) and/or $R^2{}_2SiO_{2/2}$ units (i.e., D units), where $R^1$ and $R^2$ are as described and exemplified above. For example, the silicone resin can be a T resin, a TQ resin, a DT resin, an MT resin, an MDT resin, an MQ resin, a DQ resin, an MDQ resin, an MTQ resin, a DTQ resin, or an MDTQ resin.

Examples of silicone resins include, but are not limited to, resins having the following formulae:
$(MeSiO_{3/2})_n$, $(PhSiO_{3/2})_n$, $(Me_3SiO_{1/2})_{0.8}(SiO_{4/2})_{0.2}$, $(MeSiO_{3/2})_{0.67}(PhSiO_{3/2})_{0.33}$, $(MeSiO_{3/2})_{0.45}(PhSiO_{3/2})_{0.40}(Ph_2SiO_{2/2})_{0.1}(PhMeSiO_{2/2})_{0.05}$, $(PhSiO_{3/2})_{0.4}(MeSiO_{3/2})_{0.45}(PhSiO_{3/2})_{0.1}(PhMeSiO_{2/2})_{0.05}$, and $(PhSiO_{3/2})_{0.4}(MeSiO_{3/2})_{0.1}(PhMeSiO_{2/2})_{0.5}$ where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

The first embodiment of the condensation-curable silicone composition can comprise a single silicone resin or a mixture comprising two or more different silicone resins, each as described above.

Methods of preparing silicone resins containing silicon-bonded hydrogen atoms, hydroxy groups, or hydrolysable groups are well known in the art; many of these resins are commercially available. Silicone resins are typically prepared by cohydrolyzing the appropriate mixture of silane precursors in an organic solvent, such as toluene. For example, a silicone resin can be prepared by cohydrolyzing a silane having the formula $R^1R^2_2SiX$ and a silane having the formula $R^2SiX_3$ in toluene, where $R^1$ is $C_1$ to $C_{10}$ hydrocarbyl or $C_1$ to $C_{10}$ halogen-substituted hydrocarbyl, $R^2$ is $R^1$, —H, or a hydrolysable group, and X is a hydrolysable group, provided when $R^2$ is a hydrolysable group, X is more reactive in the hydrolysis reaction than $R^2$. The aqueous hydrochloric acid and silicone hydrolyzate are separated and the hydrolyzate is washed with water to remove residual acid and heated in the presence of a mild condensation catalyst to "body" (i.e., condense) the resin to the requisite viscosity. If desired, the resin can be further treated with a condensation catalyst in an organic solvent to reduce the content of silicon-bonded hydroxy groups.

The first embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters; dyes; pigments; anti-oxidants; heat stabilizers; UV stabilizers; flame retardants; flow control additives; organic solvents, cross-linking agents, and condensation catalysts.

For example the silicone composition can further comprises a cross-linking agent and/or a condensation catalyst. The cross-linking agent can have the formula $R^3_qSiX_{4-q}$, wherein $R^3$ is $C_1$ to $C_8$ hydrocarbyl or $C_1$ to $C_8$ halogen-substituted hydrocarbyl, X is a hydrolysable group, and q is 0 or 1. The hydrocarbyl and halogen-substituted hydrocarbyl groups represented by $R^3$, and the hydrolysable groups represented by X are as described and exemplified above.

Examples of cross-linking agents include, but are not limited to, alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The cross-linking agent can be a single silane or a mixture of two or more different silanes, each as described above. Also, methods of preparing tri- and tetra-functional silanes are well known in the art; many of these silanes are commercially available.

When present, the concentration of the cross-linking agent in the silicone composition is sufficient to cure (cross-link) the silicone resin. The exact amount of the cross-linking agent depends on the desired extent of cure, which generally increases as the ratio of the number of moles of silicon-bonded hydrolysable groups in the cross-linking agent to the number of moles of silicon-bonded hydrogen atoms, hydroxy groups, or hydrolysable groups in the silicone resin increases. Typically, the concentration of the cross-linking agent is sufficient to provide from 0.2 to 4 moles of silicon-bonded hydrolysable groups per mole of silicon-bonded hydrogen atoms, hydroxy groups, or hydrolysable groups in the silicone resin. The optimum amount of the cross-linking agent can be readily determined by routine experimentation.

As stated above, the first embodiment of the condensation-curable silicone composition can further comprise at least one condensation catalyst. The condensation catalyst can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst can be selected from tin(II) and tin(IV) compounds such as tin dilaurate, tin dioctoate, and tetrabutyl tin; and titanium compounds such as titanium tetrabutoxide.

When present, the concentration of the condensation catalyst is typically from 0.1 to 10% (w/w), alternatively from 0.5 to 5% (w/w), alternatively from 1 to 3% (w/w), based on the total weight of the silicone resin.

According to a second embodiment, the condensation-curable silicone composition comprises (A) a rubber-modified silicone resin prepared by reacting an organosilicon compound selected from (i) a silicone resin having the formula $(R^1R^4_2SiO_{1/2})_w(R^4_2SiO_{2/2})_x(R^4SiO_{3/2})_y(SiO_{4/2})_z$ (II) and (ii) hydrolysable precursors of (i), and a silicone rubber having the formula $R^5_3SiO(R^1R^5SiO)_mSiR^5_3$ (III) in the presence of water, a condensation catalyst, and an organic solvent to form a soluble reaction product, wherein $R^1$ is $C_1$ to $C_{10}$ hydrocarbyl or $C_1$ to $C_{10}$ halogen-substituted hydrocarbyl, $R^4$ is $R^1$, —OH, or a hydrolysable group, $R^5$ is $R^1$ or a hydrolysable group, m is from 2 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5; and (B) a condensation catalyst.

Component (A) is a rubber-modified silicone resin prepared by reacting an organosilicon compound selected from (i) at least one silicone resin having the formula $(R^1R^4_2SiO_{1/2})_w(R^4_2SiO_{2/2})_x(R^4SiO_{3/2})_y(SiO_{4/2})_z$ (II) and (ii) hydrolysable precursors of (i), and at least one silicone rubber having the formula $R^5_3SiO(R^1R^5SiO)_mSiR^5_3$ (III) in the presence of water, a condensation catalyst, and an organic solvent to form a soluble reaction product, wherein $R^1$, w, x, y, z, y+z, and w+x are as described and exemplified above for the silicone resin having the formula (I), the hydrolysable groups represented by $R^4$ and $R^5$ are as described and exemplified above for $R^2$, and m has a value of from 2 to 1,000, provided the silicone resin (II) has an average of at least two silicon-bonded hydroxy or hydrolysable groups per molecule, the silicone rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in the silicone resin (II) is from 0.01 to 1.5. As used herein, the term "soluble reaction product" means the product of the reaction for preparing component (A) is miscible in the organic solvent and does not form a precipitate or suspension.

Typically at least 10 mol %, alternatively at least 50 mol %, alternatively at least 80 mol % of the groups $R^4$ in the silicone resin (i) are hydroxy or hydrolysable groups.

The silicone resin (i) typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin (i) at 25° C. is typically from 0.01 to 100,000 Pa·s, alternatively from 0.1 to 10,000 Pa·s, alternatively from 1 to 100 Pa·s.

The silicone resin (i) contains $R^4SiO_{3/2}$ units (i.e., T units), $R^4SiO_{3/2}$ units (i.e., T units) and $SiO_{4/2}$ units (i.e., Q units), or $R^4SiO_{3/2}$ units (i.e., T units) and/or $SiO_{4/2}$ units (i.e., Q units) in combination with $R^1R^4_2SiO_{1/2}$ units (i.e., M units) and/or $R^4_2SiO_{2/2}$ units (i.e., D units), where $R^1$ and $R^4$ are as described and exemplified above. For example, the silicone resin can be a T resin, a TQ resin, a DT resin, an MT resin, an MDT resin, an MQ resin, a DQ resin, an MDQ resin, an MTQ resin, a DTQ resin, or an MDTQ resin.

Examples of silicone resins suitable for use as silicone resin (i) include, but are not limited to, resins having the following formulae:
$(MeSiO_{3/2})_n$, $(PhSiO_{3/2})_n$, $(PhSiO_{3/2})_{0.4}(MeSiO_{3/2})_{0.45}(PhSiO_{3/2})_{0.1}(PhMeSiO_{2/2})_{0.05}$, and $(PhSiO_{3/2})_{0.3}(SiO_{4/2})_{0.1}(Me_2SiO_{2/2})_{0.2}(Ph_2SiO_{2/2})_{0.4}$, where Me is methyl, Ph is phenyl, the numerical subscripts outside the parenthesis denote mole fractions, and the subscript n has a value such that the silicone resin has a number-average molecular weight of from 500 to 50,000. Also, in the preceding formulae, the sequence of units is unspecified.

Silicone resin (i) can be a single silicone resin or a mixture comprising two or more different silicone resins, each having the formula (II).

Methods of preparing silicone resins suitable for use as silicone resin (i) are well known in the art; many of these resins are commercially available. For example, silicone resins are typically prepared by cohydrolyzing the appropriate mixture of silane precursors in an organic solvent, such as toluene, as described above for the silicone resin having the formula (I).

The organosilicon compound can also be (ii) hydrolysable precursors of the silicone resin having the formula (II). As used herein, the term. "hydrolysable precursors" refers to silanes having hydrolysable groups that are suitable for use as starting materials (precursors) for preparation of the silicone resin having the formula (II). The hydrolysable precursors can be represented by the formulae $R^1R^4_2SiX$, $R^4_2SiX_2$, $R^4SiX_3$, and $SiX_4$, wherein $R^1$ is $C_1$ to $C_{10}$ hydrocarbyl or $C_1$ to $C_{10}$ halogen-substituted hydrocarbyl, $R^4$ is $R^1$ or a hydrolysable group, and X is a hydrolysable group. Examples of hydrolysable precursors include, but are not limited to, silanes having the formulae:
$Me_2ViSiCl$, $Me_3SiCl$, $MeSi(OEt)_3$, $PhSiCl_3$, $MeSiCl_3$, $Me_2SiCl_2$, $PhMeSiCl_2$, $SiCl_4$, $Ph_2SiCl_2$, $PhSi(OMe)_3$, $MeSi(OMe)_3$, $PhMeSi(OMe)_2$, and $Si(OEt)_4$, wherein Me is methyl, Et is ethyl, and Ph is phenyl.

Methods of preparing silanes having hydrolysable groups are well known in the art; many of these compounds are commercially available.

In the formula (III) of the silicone rubber, $R^1$ and $R^5$ are as described and exemplified above, and the subscript m typically has a value of from 2 to 1,000, alternatively from 4 to 500, alternatively from 8 to 400.

Examples of silicone rubbers having the formula (III) include, but are not limited to, silicone rubbers having the following formulae:
$(EtO)_3SiO(Me_2SiO)_{55}Si(OEt)_3$, $(EtO)_3SiO(Me_2SiO)_{16}Si(OEt)_3$, $(EtO)_3SiO(Me_2SiO)_{386}Si(OEt)_3$, and $(EtO)_2MeSiO(PhMeSiO)_{10}SiMe(OEt)_2$, wherein Me is methyl and Et is ethyl.

The silicone rubber having the formula (III) can be a single silicone rubber or a mixture comprising two or more different silicone rubbers, each having the formula (III). For example the silicone rubber can comprise a first silicone rubber having a dp (degree of polymerization), denoted by the value of m in formula III, of about 15 and a second silicone rubber having a dp of about 350.

Methods of preparing silicone rubbers containing silicon-bonded hydrolysable groups are well known in the art; many of these compounds are commercially available.

The condensation catalyst used in the preparation of the rubber-modified silicone resin of component (A) is as described and exemplified above for the first embodiment of the condensation-curable silicone composition. In particular, titanium compounds are suitable condensation catalysts for use in the preparation of component (A).

The organic solvent is at least one organic solvent. The organic solvent can be any aprotic or dipolar aprotic organic solvent that does not react with the organosilicon compound, the silicone rubber, or the rubber-modified silicone resin under the conditions for preparing component (A), described below, and is miscible with the aforementioned components.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as defined above.

The organosilicon compound, the silicone rubber, condensation catalyst, and organic solvent can be combined in any order. Typically, the organosilicon compound, silicone rubber, and organic solvent are combined before the introduction of the condensation catalyst.

The mole ratio of silicon-bonded hydrolysable groups in the silicone rubber to silicon-bonded hydroxy or hydrolysable groups in the silicone resin having the formula (II) is typically from 0.01 to 1.5, alternatively from 0.05 to 0.8, alternatively from 0.2 to 0.5.

The concentration of water in the reaction mixture depends on the nature of the groups $R^4$ in the organosilicon compound and the nature of the silicon-bonded hydrolysable groups in the silicone rubber. When the organosilicon compound contains hydrolysable groups, the concentration of water is sufficient to effect hydrolysis of the hydrolysable groups in the organosilicon compound and the silicone rubber. For example, the concentration of water is typically from 0.01 to 3 moles, alternatively from 0.05 to 1 moles, per mole of hydrolysable group in the organosilicon compound and the silicone rubber combined. When the organosilicon compound does not contain hydrolysable groups, only a trace amount, e.g., 100 ppm, of water is required in the reaction mixture. Trace amounts of water are normally present in the reactants and/or solvent.

The concentration of the condensation catalyst is sufficient to catalyze the condensation reaction of the organosilicon compound with the silicone rubber. Typically, the concentration of the condensation catalyst is from 0.01 to 2% (w/w), alternatively from 0.01 to 1% (w/w), alternatively from 0.05 to 0.2% (w/w), based on the weight of the organosilicon compound.

The concentration of the organic solvent is typically from 10 to 95% (w/w), alternatively from 20 to 85% (w/w), alternatively from 50 to 80% (w/w), based on the total weight of the reaction mixture.

The reaction is typically carried out at a temperature of from room temperature (~23±2° C.) to 180° C., alternatively from room temperature to 100° C.

The reaction time depends on several factors, including the structures of the organosilicon compound and the silicone rubber, and the temperature. The components are typically allowed to react for a period of time sufficient to complete the condensation reaction. This means the components are allowed to react until at least 95 mol %, alternatively at least 98 mol %, alternatively at least 99 mol %, of the silicon-bonded hydrolysable groups originally present in the silicone rubber have been consumed in the condensation reaction, as determined by $^{29}Si$ NMR spectrometry. The time of reaction is typically from 1 to 30 h at a temperature of from room temperature (~23±2° C.) to 100° C. The optimum reaction time can be determined by routine experimentation using the methods set forth in the Examples section below.

The rubber-modified silicone resin can be used without isolation or purification in the second embodiment of the condensation-curable silicone composition or the resin can be separated from most of the solvent by conventional methods of evaporation. For example, the reaction mixture can be heated under reduced pressure.

Component (B) of the second embodiment of the condensation-curable silicone composition is at least one condensation catalyst, where the catalyst is as described and exemplified above for the first embodiment of the silicone composition. In particular, zinc compounds and amines are suitable for use as component (B) of the present silicone composition.

The concentration of component (B) is typically from 0.1 to 10% (w/w), alternatively from 0.5 to 5% (w/w), alternatively from 1 to 3% (w/w), based on the weight of component (A).

The second embodiment of the condensation-curable silicone composition can comprise additional ingredients, provided the ingredient does not prevent the silicone resin from curing to form a cured silicone resin having low coefficient of thermal expansion, high tensile strength, and high modulus, as described below. Examples of additional ingredients include, but are not limited to, adhesion promoters, dyes, pigments, anti-oxidants, heat stabilizers, UV stabilizers, flame retardants, flow control additives, cross-linking agents, and organic solvents.

For example the second embodiment of the condensation-curable silicone composition can further comprises a cross-linking agent having the formula $R^3_qSiX_{4-q}$, wherein $R^3$, X, and q are as described and exemplified above for the cross-linking agent of the first embodiment. The cross-linking agent can be a single silane or a mixture of two or more different silanes, each as described above.

When present, the concentration of the cross-linking agent in the second embodiment of the condensation-curable silicone composition is sufficient to cure (cross-link) the rubber-modified silicone resin of component (A). The exact amount of the cross-linking agent depends on the desired extent of cure, which generally increases as the ratio of the number of moles of silicon-bonded hydrolysable groups in the cross-linking agent to the number of moles of silicon-bonded hydroxy or hydrolysable groups in the rubber-modified silicone resin increases. Typically, the concentration of the cross-linking agent is sufficient to provide from 0.2 to 4 moles of silicon-bonded hydrolysable groups per mole of silicon-bonded hydroxy or hydrolysable groups in the rubber-modified silicone resin. The optimum amount of the cross-linking agent can be readily determined by routine experimentation.

The curable composition comprising a thermosetting polymer can further comprise a carbon nanomaterial, which is as described and exemplified above. When present, the carbon nanomaterial typically has a concentration of from 0.0001 to 99% (w/w), alternatively from 0.001 to 50% (w/w), alternatively from 0.01 to 25% (w/w), alternatively from 0.1 to 10% (w/w), alternatively from 1 to 5% (w/w), based on the total weight of the thermosetting polymer.

The release liner can be coated with the curable composition comprising a thermosetting polymer using conventional coating techniques, such as spin coating, dipping, spraying, brushing, extrusion, or screen-printing. The amount of the composition is sufficient to form a first polymer layer having a thickness of from 0.01 to 1000 µm after the polymer is cured in step (ii) of the method, described below.

In step (ii) of the immediately preceding method of forming the first polymer layer, the thermosetting polymer of the coated release liner is cured. The thermosetting polymer can be cured using a variety of methods, including exposing the polymer to ambient temperature, elevated temperature, moisture, or radiation, depending on the type of curable composition used to coat the release liner.

When the curable composition used to coat the release liner is a condensation-curable silicone composition comprising at least one silicone resin having an average of at least two silicon-bonded hydroxy groups per molecule, the silicone resin of the coated release liner can be cured by heating the coating at a temperature sufficient to cure the silicone resin. For example, the silicone resin can typically be cured by heating the coating at a temperature of from 50 to 250° C., or a period of from 1 to 50 h. When the condensation-curable silicone composition comprises a condensation catalyst, the silicone resin can typically be cured at a lower temperature, e.g., from room temperature (~23±2° C.) to 200° C.

When the curable composition used to coat the release liner is a condensation-curable silicone composition comprising at least one silicone resin having an average of at least two silicon-bonded hydrogen atoms per molecule (e.g., a silicone resin of the first embodiment of the condensation-curable silicone composition), the silicone resin can be cured by exposing the coating to moisture or oxygen at a temperature of from 100 to 450° C. for a period of from 0.1 to 20 h. When the condensation-curable silicone composition contains a condensation catalyst, the silicone resin can typically be cured at a lower temperature, e.g., from room temperature (~23±2° C.) to 400° C.

Further, when the curable composition used to coat the release liner is a condensation-curable silicone composition comprising at least one silicone resin having an average of at least two silicon-bonded hydrolysable groups per molecule, the silicone resin can be cured by exposing the coating to moisture at a temperature of from room temperature (~23±2° C.) to 250° C., alternatively from 100 to 200° C., for a period of from 1 to 100 h. For example, the silicone resin can typically be cured by exposing the coating to a relative humidity of 30% at a temperature of from about room temperature (~23±2° C.) to 150° C., for a period of from 0.5 to 72 h. Cure can be accelerated by application of heat, exposure to high humidity, and/or addition of a condensation catalyst to the composition.

The silicone resin can be cured at atmospheric or subatmospheric pressure. For example, when the coating is not enclosed between two release liners, the silicone resin is typically cured at atmospheric pressure in air. Alternatively, when the coating is enclosed between a first and second release liner, described below, the silicone resin is typically cured under reduced pressure. For example, the silicone resin can be heated under a pressure of from 1,000 to 20,000 Pa, alternatively from 1,000 to 5,000 Pa. The silicone resin can be cured under reduced pressure using a conventional vacuum bagging process. In a typically process, a bleeder (e.g., polyester) is applied over the coated release liner, a breather (e.g., Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly and, if necessary, the evacuated assembly is heated as described above.

The method of forming the first polymer layer, wherein the layer comprises a thermoset polymer, can further comprise, after step (i) and before step (ii), applying a second release liner to the coated release liner of the first step to form an assembly, and compressing the assembly. The assembly can be compressed to remove excess composition and/or entrapped air, and to reduce the thickness of the coating. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 50° C.

The method of forming the first polymer layer, wherein the layer comprises a thermoset polymer, can further comprise repeating the steps (i) and (ii) to increase the thickness of the polymer layer, provided the same curable composition is used for each coating step.

When the first polymer layer comprises a thermoplastic polymer and a fiber reinforcement, the polymer layer can be formed by (a) impregnating a fiber reinforcement in a composition comprising a thermoplastic polymer in a fluid state and (b) converting the thermoplastic polymer of the impregnated fiber reinforcement to a solid state.

In step (a) of the immediately preceding method of forming the first polymer layer, a fiber reinforcement is impregnated in a composition comprising a thermoplastic polymer in a fluid state.

The fiber reinforcement can be impregnated in a composition comprising a thermoplastic polymer in a fluid state using a variety of methods. For example, according to a first method, the fiber reinforcement can be impregnated by (i) applying a composition comprising a thermoplastic polymer in a fluid state to a release liner to form a film; (ii) embedding a fiber reinforcement in the film; and (iii) applying the composition to the embedded fiber reinforcement to form an impregnated fiber reinforcement.

In step (i) of the immediately preceding method of impregnating a fiber reinforcement, a composition comprising a thermoplastic polymer in a fluid state is applied to a release liner to form a film. The release liner and the composition are as described and exemplified above. The composition can be applied to the release liner using conventional coating techniques, such as spin coating, dipping, spraying, brushing, extrusion, or screen-printing. The composition is applied in an amount sufficient to embed the fiber reinforcement in step (ii), below.

In step (ii), a fiber reinforcement is embedded in the film. The fiber reinforcement is as described and exemplified above. The fiber reinforcement can be embedded in the film by simply placing the reinforcement on the film and allowing the composition of the film to saturate the reinforcement.

In step (iii) the composition comprising a thermoplastic polymer in a fluid state is applied to the embedded fiber reinforcement to form an impregnated fiber reinforcement. The composition can be applied to the embedded fiber reinforcement using conventional methods, as described above for step (i).

The first method of impregnating a fiber reinforcement can further comprise the steps of (iv) applying a second release liner to the impregnated fiber reinforcement to form an assembly; and (v) compressing the assembly. Also, the first method can further comprise after step (ii) and before step (iii), degassing the embedded fiber reinforcement and/or after step (iii) and before step (iv), degassing the impregnated fiber reinforcement.

The assembly can be compressed to remove excess composition and/or entrapped air, and to reduce the thickness of the impregnated fiber reinforcement. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature to 200° C.

The embedded fiber reinforcement or impregnated fiber reinforcement can be degassed by subjecting it to a vacuum at a temperature sufficient to maintain the fluid state of the thermoplastic polymer.

Alternatively, according to a second method, the fiber reinforcement can be impregnated in the composition comprising a thermoplastic polymer in a fluid state by (i) depositing a fiber reinforcement on a release liner; (ii) embedding the fiber reinforcement in a composition comprising a thermoplastic polymer in a fluid state; and (iii) applying the composition to the embedded fiber reinforcement to form an impregnated fiber reinforcement. The second method can further comprise the steps of (iv) applying a second release liner to the impregnated fiber reinforcement to form an assembly; and (v) compressing the assembly. In the second method, steps (iii) to (v) are as described above for the first method of impregnating a fiber reinforcement in a composition comprising a thermoplastic polymer in a fluid state. Also, the second method can further comprise after step (ii) and before step (iii), degassing the embedded fiber reinforcement and/or after step (iii) and before step (iv), degassing the impregnated fiber reinforcement.

In step (ii) of the immediately preceding method of impregnating a fiber reinforcement, a fiber reinforcement is embedded in a composition comprising a thermoplastic polymer in a fluid state. The fiber reinforcement can be embedded in the composition by simply covering the reinforcement with the composition and allowing the composition to saturate the reinforcement.

Furthermore, when the fiber reinforcement is a woven or nonwoven fabric, the reinforcement can be impregnated in a composition comprising a thermoplastic polymer in a fluid state by passing it through the composition. The fabric is typically passed through the composition at a rate of from 1 to 1,000 cm/min.

In step (b) of the preceding method of forming the first polymer layer, the thermoplastic polymer of the impregnated fiber reinforcement is converted to a solid state. When the composition used to coat the release liner comprises a thermoplastic polymer in a molten state, the thermoplastic polymer can be converted to a solid state by allowing the polymer to cool to a temperature below the liquid-solid transition temperature ($T_g$ or $T_m$), for example, room temperature. When the composition used to coat the release liner comprises a thermoplastic polymer and an organic solvent, the thermoplastic polymer can be converted to a solid state by removing at least a portion of the solvent. The organic solvent can be removed by allowing the solvent to evaporate at ambient temperature or by heating the coating to a moderate temperature, for example, below the solid-liquid transition temperature of the polymer.

The method of forming the first polymer layer, wherein the layer contains a composition comprising a thermoplastic resin in fluid state and a fiber reinforcement, can further comprise repeating the steps (a) and (b) to increase the thickness of the polymer layer, provided the same composition is used for each impregnation.

When the first polymer layer comprises a thermoset polymer and a fiber reinforcement, the polymer layer can be formed by (a') impregnating a fiber reinforcement in a curable composition comprising a thermosetting polymer; and (b') curing the thermosetting polymer of the impregnated fiber reinforcement.

In step (a') of the immediately preceding method of forming the first polymer layer, a fiber reinforcement is impregnated in a curable composition comprising a thermosetting polymer. The fiber reinforcement and composition are as described and exemplified above. The fiber reinforcement can be impregnated in the curable composition using the method described above for impregnating a fiber reinforcement in a composition comprising a thermoplastic polymer.

In step (b') of the immediately preceding method of forming the first polymer layer, the thermosetting polymer of the impregnated fiber reinforcement is cured. The thermosetting polymer can be cured using a variety of methods, including, exposing the impregnated fiber reinforcement to ambient or elevated temperature, moisture, or radiation, depending on the type of curable composition used to impregnate the fiber reinforcement.

When the curable composition used to impregnated the fiber reinforcement is a condensation-curable silicone composition comprising at least one silicone resin having an average of at least two silicon-bonded hydroxy groups per molecule, the silicone resin can be cured by heating the impregnated fiber reinforcement at a temperature sufficient to cure the silicone resin. For example, the silicone resin can typically be cured by heating the coating at a temperature of from 50 to 250° C., for a period of from 1 to 50 h. When the condensation-curable silicone composition comprises a condensation catalyst, the silicone resin can typically be cured at a lower temperature, e.g., from room temperature (~23±2° C.) to 200° C.

When the curable composition used to impregnate the fiber reinforcement is a condensation-curable silicone composition comprising at least one silicone resin having an average of at least two silicon-bonded hydrogen atoms per molecule (e.g., a silicone resin of the first embodiment of the condensation-curable silicone composition), the silicone resin can be cured by exposing the impregnated fiber reinforcement to moisture or oxygen at a temperature of from 100 to 450° C. for a period of from 0.1 to 20 h. When the condensation-curable silicone composition contains a condensation catalyst, the silicone resin can typically be cured at a lower temperature, e.g., from room temperature (~23±2° C.) to 400° C.

Further, when the curable composition used to impregnate the fiber reinforcement is a condensation-curable silicone composition comprising at least one silicone resin having an average of at least two silicon-bonded hydrolysable groups per molecule, the silicone resin can be cured by exposing the impregnated fiber reinforcement to moisture at a temperature of from room temperature (~23±2° C.) to 250° C., alternatively from 100 to 200° C., for a period of from 1 to 100 h. For example, the silicone resin can typically be cured by exposing the impregnated fiber reinforcement to a relative humidity of 30% at a temperature of from about room temperature (~23±2° C.) to 150° C., for a period of from 0.5 to 72 h. Cure can be accelerated by application of heat, exposure to high humidity, and/or addition of a condensation catalyst to the composition.

The silicone resin of the impregnated fiber reinforcement can be cured at atmospheric or subatmospheric pressure, depending on the method, described above employed to impregnate the fiber reinforcement in the condensation-curable silicone composition. For example, when the coating is not enclosed between a first and second release liner, the silicone resin is typically cured at atmospheric pressure in air. Alternatively, when the coating is enclosed between a first and second release liner, the silicone resin is typically cured under reduced pressure. For example, the silicone resin can be heated under a pressure of from 1,000 to 20,000 Pa, alternatively from 1,000 to 5,000 Pa. The silicone resin can be cured under reduced pressure using a conventional vacuum bagging process. In a typically process, a bleeder (e.g., polyester) is applied over the coated release liner, a breather (e.g., Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly and, if necessary, the evacuated assembly is heated as described above.

The method of preparing the first polymer layer, wherein the layer comprises a thermoset polymer and a fiber reinforcement, can further comprise repeating the steps (a') and (b') to increase the thickness of the polymer layer, provided the same curable composition is used for each impregnation.

In the second step of the method of preparing the first reinforced silicone resin film, a second polymer layer, described above, is formed on the first polymer layer. The second polymer layer can be formed as described above in the method of forming the first polymer layer, except the second polymer layer is formed on the first polymer layer rather than the release liner.

The method of preparing the first reinforced silicone resin film can further comprise separating the first polymer layer from the release liner(s). The first polymer layer can be separated from the release liner(s) either before or after the second polymer layer is formed. Moreover, the first polymer layer can be separated from the release liner by mechanically peeling the layer away for the release liner.

A second reinforced silicone resin film according to the present invention comprises:
a first polymer layer;
a second polymer layer on the first polymer layer; and
at least one additional polymer layer on at least one of the first and second polymer layers; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial.

The first polymer layer of the second reinforced silicone resin film typically has a thickness of from 0.01 to 1000 1m, alternatively from 5 to 500 µm, alternatively from 10 to 100 µm.

The first polymer layer of the second reinforced silicone resin film can comprise a thermoplastic or thermoset polymer. The thermoplastic and thermoset polymers are as described and exemplified above for the first reinforced silicone resin film.

In addition to a thermoplastic or thermoset polymer, the first polymer layer of the second reinforced silicone resin film can comprise a carbon nanomaterial, a fiber reinforcement, or a mixture thereof, each as described and exemplified above.

The second polymer layer and the additional polymer layer(s) of the second reinforced silicone resin film are as described and exemplified above for the first polymer layer. Adjacent layers of the second reinforced silicone resin film differ in at least one of numerous physical and chemical properties, including thickness, polymer composition, crosslink density, concentration of carbon nanomaterial, or concentration of an additional ingredient.

The second reinforced silicone resin film typically comprises from 1 to 100 additional polymer layers, alternatively from 1 to 10 additional polymer layers, alternatively from 2 to 5 additional polymer layers.

At least one of the polymer layers of the second reinforced silicone resin film comprises a cured product of at least one silicone resin having an average of at least two silicon-bonded hydrogen atoms, hydroxy groups, or hydrolysable groups per molecule. The silicone resin, methods of preparing the resin, and methods of preparing the cured product of the silicone resin are as described above in the method of preparing the first reinforced silicone resin film of the present invention.

At least one of the polymer layers of the second reinforced silicone resin film comprises a carbon nanomaterial. The carbon nanomaterial, concentration of carbon nanomaterial, and method of preparing the carbon nanomaterial are as described and exemplified above for the first reinforced silicone resin film.

The first polymer layer, second polymer layer, and additional polymer layer(s) can be prepared as described below in the method of preparing the second reinforced silicone resin film of the present invention.

The second reinforced silicone resin film can be prepared by a method comprising:
forming a first polymer layer on a release liner;
forming a second polymer layer on the first polymer layer; and
forming at least one additional polymer layer on at least one of the first and second polymer layers; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial.

The first polymer layer, the second polymer layer, and the additional polymer layer(s) can be formed as described above in the method of preparing the first reinforced silicone resin film.

The reinforced silicone resin films of the present invention typically comprise from 1 to 99% (w/w), alternatively from 10 to 95% (w/w), alternatively from 30 to 95% (w/w), alternatively from 50 to 95% (w/w), of the cured silicone resin. Also, the reinforced silicone resin films typically have a thickness of from 1 to 3000 µm, alternatively from 15 to 500 µm, alternatively from 15 to 300 µm, alternatively from 20 to 150 µm, alternatively from 30 to 125 µm.

The reinforced silicone resin films typically have a flexibility such that the films can be bent over a cylindrical steel mandrel having a diameter less than or equal to 3.2 mm without cracking, where the flexibility is determined as described in ASTM Standard D522-93a, Method B.

The reinforced silicone resin films have low coefficient of linear thermal expansion (CTE), high tensile strength, high modulus, and high resistance to thermally induced cracking. For example the films typically have a CTE of from 0 to 80 µm/m° C., alternatively from 0 to 20 µm/m° C., alternatively from 2 to 10 µm/m° C., at temperature of from room temperature (~23±2° C.) to 200° C. Also, the films typically have a tensile strength at 25° C. of from 5 to 200 MPa, alternatively from 20 to 200 MPa, alternatively from 50 to 200 MPa. Further, the reinforced silicone resin films typically have a Young's modulus at 25° C. of from 0.5 to 10 GPa, alternatively from 1 to 6 GPa, alternatively from 3 to 5 GPa.

The transparency of the reinforced silicone resin films depends on a number of factors, such as the composition of the cured silicone resin, the thickness of the film, and the type and concentration of the reinforcement. The reinforced silicone resin films typically have a transparency (% transmittance) of at least 5%, alternatively at least 10%, alternatively at least 15%, alternatively at least 20%, in the visible region of the electromagnetic spectrum.

The reinforced silicone resin films of the present invention are useful in applications requiring films having high thermal stability, flexibility, mechanical strength, and transparency. For example, the silicone resin films can be used as integral components of flexible displays, solar cells, flexible electronic boards, touch screens, fire-resistant wallpaper, and impact-resistant windows. The films are also suitable substrates for transparent or nontransparent electrodes.

EXAMPLES

The following examples are presented to better illustrate the reinforced silicone resin films and methods of the present invention, but are not to be considered as limiting the invention, which is delineated in the appended claims. Unless otherwise noted, all parts and percentages reported in the examples are by weight. The following materials were employed in the examples:

Pyrograf®-III grade HHT-19 carbon nanofiber, sold by Pyrograf Products, Inc. (Cedarville, Ohio), is a heat-treated (up to 3000° C.) carbon nanofiber having a diameter of 100 to 200 nm and a length of 30,000 to 100,000 mm.

SDC MP101 Crystal Coat Resin, which is sold by SDC Technologies, Inc. (Anaheim, Calif.) is a solution containing 31% (w/w) of a silicone resin consisting essentially of MeSiO$_{3/2}$ units and SiO$_{4/2}$ units in a mixture of methanol, 2-propanol, water, and acetic acid (~1-2%).

Glass Fabric is a heat-treated glass fabric prepared by heating style 106 electrical glass fabric having a plain weave and a thickness of 37.5 μm at 575° C. for 6 h. The untreated glass fabric was obtained from JPS Glass (Slater, S.C.).

Example

This example demonstrates the preparation of a chemically oxidized carbon nanofiber. Pyrograf®-III carbon nanofiber (2.0 g), 12.5 mL of concentrated nitric acid, and 37.5 mL of concentrated sulfuric acid were combined sequentially in a 500-mL three-neck flask equipped with a condenser, a thermometer, a Teflon-coated magnetic stirring bar, and a temperature controller. The mixture was heated to 80° C. and kept at this temperature for 3 h. The mixture was then cooled by placing the flask on a layer of dry ice in a one gallon pail. The mixture was poured into a Buchner funnel containing a nylon membrane (0.8 μm) and the carbon nanofibers were collected by vacuum filtration. The nanofibers remaining on the membrane were washed several times with deionized water until the pH of the filtrate was equal to the pH of the wash water. After the last wash, the carbon nanofibers were kept in the funnel for an additional 15 min. with continued application of the vacuum. Then the nanofibers, supported on the filter membrane, were placed in an oven at 100° C. for 1 h. The carbon nanofibers were removed from filter membrane and stored in a dry sealed glass jar.

Example 2

The oxidized carbon nanofiber of Example 1 (0.031 g) and 50.0 g of SDC MP101 Crystal Coat Resin were combined in a glass vial. The vial was placed in an ultrasonic bath for 30 min. The mixture was then subjected to centrifugation at 2000 rpm for 30 min. The supernatant composition was used to prepare reinforced silicone resin films, as described below.

Example 3

Glass fabric (38.1 cm×8.9 cm) was impregnated with MP101 Crystal Coat Resin by passing the fabric through the composition at a rate of about 5 cm/s. The impregnated fabric was then hung vertically in a fume hood at room temperature to dry, and then cured in an air-circulating oven according to the following cycle: room temperature to 75° C. at 1° C./min., 75° C. for 1 h; 75° C. to 100° C. at 1° C./min., 100° C. for 1 h; and 100° C. to 125° C. at 1° C./min., 125° C. for 1 h. The oven was turned off and the silicone resin film was allowed to cool to room temperature.

The film was impregnated with a silicone composition prepared by diluting the carbon nanofiber-filled silicone composition of Example 2 to 20.75% (w/w) resin with 2-propanol. The impregnated fabric was then dried and cured as previously described following the first impregnation.

The three-layer reinforced silicone resin film was then heat-treated in an oven in a nitrogen atmosphere under the following conditions: room temperature to 575° C. at 5° C./min., 575° C. for 1 h. The oven was turned off and the reinforced silicone resin film was allowed to cool to room temperature. Photomicrographs of the film before heat treatment are shown in FIG. 1A (top view) and 1B (cross-sectional view). A photomicrograph of the reinforced silicone resin film after heat treatment is shown in FIG. 1C. The heat-treated film is free of cracks.

Comparative Example 1

An unreinforced silicone resin film was prepared according to the method of Example 3, except the second impregnation was carried out using a silicone composition prepared by diluting MP101 Crystal Coat Resin to 20.75% (w/w) resin with 2-propanol.

Figure 2:
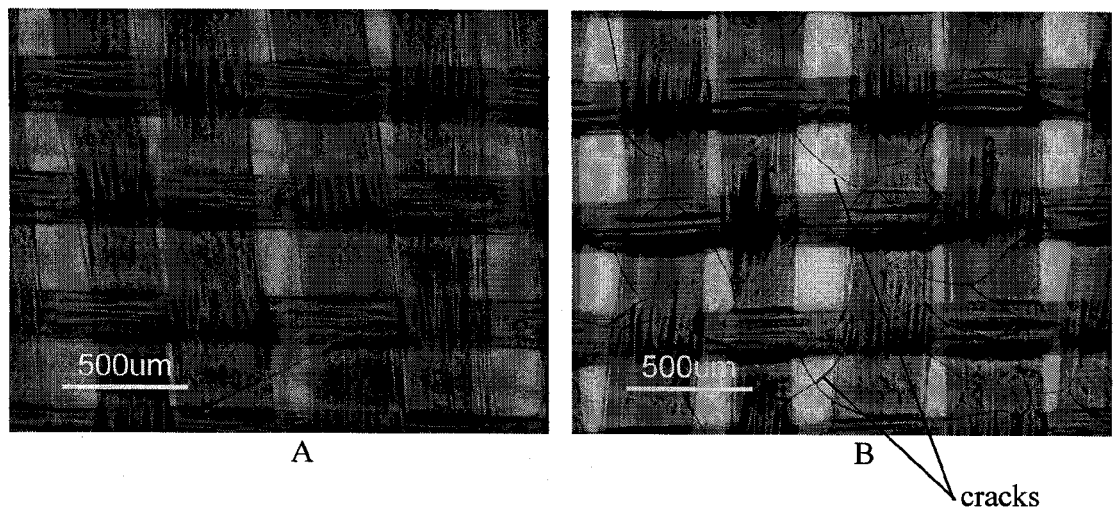
FIGS. 2A and 2B are plan view photomicrographs of the unreinforced silicone resin film of Comparative Example 1 before and after heat treatment, respectively.

After curing, the three-layer silicone resin film was heat-treated in an air-circulating oven under the following conditions: room temperature to 400° C. at 5° C./min., 400° C. for 1 h. The oven was turned off and the film was allowed to cool to room temperature. Photomicrographs of the silicone resin film before and after heat treatment are shown in FIGS. 2A and 2B, respectively. The heat-treated film contains numerous cracks.

Example 4

A reinforced silicone resin film was prepared according to the method of Example 3, except the second impregnation was carried out using a silicone composition prepared by diluting the carbon nanofiber-filled silicone composition of Example 2 to 10.35% (w/w) resin with 2-propanol.

Figure 3:
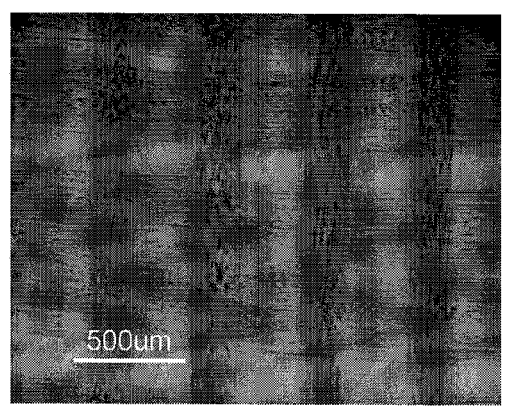
FIG. 3 is a plan view photomicrograph of the reinforced silicone resin film of Example 4 after heat treatment.

After curing, the three-layer reinforced silicone resin film was heat-treated in an oven in a nitrogen atmosphere under the following conditions: room temperature tie to 575° C. at 5° C./min., 575° C. for 1 h. The oven was turned off and the film was allowed to cool to room temperature. A photomicrograph of the reinforced silicone resin film after heat treatment is shown in FIG. 3. The heat-treated film is free of cracks.

Example 5

A reinforced silicone resin film prepared according to the method of Example 3 was impregnated with a silicone composition prepared by diluting MP101 Crystal Coat Resin to 10.35% (w/w) resin with 2-propanol. The film was dried and cured as described in Example 3.

Figure 4:
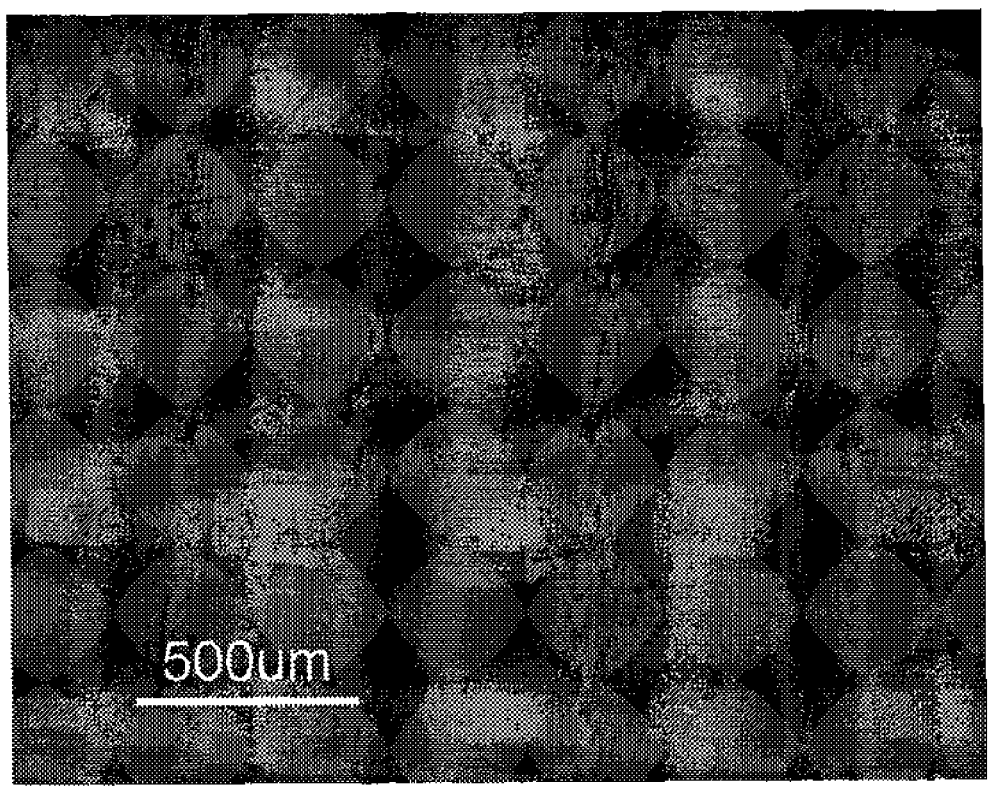
FIG. 4 is a plan view photomicrograph of the reinforced silicone resin film of Example 5 after heat treatment.

The five-layer reinforced silicone resin film was heat-treated in an oven in a nitrogen atmosphere under the following conditions: room temperature to 575° C. at 5° C./min., 575° C. for 1 h. The oven was turned off and the film was allowed to cool to room temperature. A photomicrograph of the reinforced silicone resin film after heat treatment is shown in FIG. 4. The film is free of cracks.

Comparative Example 2

An unreinforced silicone resin film was prepared according to the method of Example 3, except, the second impregnation was carried out using a silicone composition prepared by diluting MP101 Crystal Coat Resin to 10.35% (w/w) resin with 2-propanol. The cured three-layer silicone resin film was then impregnated again with the diluted MP101 Crystal Coat Resin. The film was dried and cured as described in Example 3.

The five-layer silicone resin film was heat-treated in an oven in a nitrogen atmosphere under the following conditions: room temperature to 575° C. at 5° C./min., 575° C. for 1 h. The oven was turned off and the film was allowed to cool to room temperature. Before heat treatment, approximately 14% of the surface area of the film contained micro-cracks as observed using an optical microscope and a magnification of 100 X. After heat treatment, approximately 55% of the surface area of the film contained micro-cracks.

That which is claimed is:

1. A reinforced silicone resin film consisting essentially of:
   a first polymer layer; and
   a second polymer layer on the first polymer layer; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, or (iii) a mixture comprising (i) and (ii).

2. The reinforced silicone resin film according to claim 1, wherein the first polymer layer and the second polymer layer each have a thickness of from 0.01 to 1000 μm.

3. The reinforced silicone resin film according to claim 1, wherein at least one of the first polymer layer and the second polymer layer comprises a reinforcement selected from a carbon nanomaterial, a fiber reinforcement, or a mixture thereof.

4. The reinforced silicone resin film according to claim 1, wherein the silicone resin has the formula $(R^1R^2{}_2SiO_{1/2})_w$ $(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, $R^2$ is $R^1$, —H, —OH, or a hydrolysable group, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms, hydroxy groups, or hydrolysable groups per molecule.

5. The reinforced silicone resin film according to claim 1, wherein the silicone resin is a rubber-modified silicone resin prepared by reacting an organosilicon compound selected from (i) a silicone resin having the formula $(R^1R^4{}_2SiO_{1/2})_w$ $(R^4{}_2SiO_{2/2})_x(R^4SiO_{3/2})_y(SiO_{4/2})_z$ (II) or (ii) hydrolysable precursors of (i), and a silicone rubber having the formula $R^5{}_3SiO(R^1R^5SiO)_mSiR^5{}_3$ (III) in the presence of water, a condensation catalyst, and an organic solvent to form a soluble reaction product, wherein $R^1$ is $C_1$ to $C_{10}$ hydrocarbyl or $C_1$ to $C_{10}$ halogen-substituted hydrocarbyl, $R^4$ is $R^1$, —OH, or a hydrolysable group, $R^5$ is $R^1$ or a hydrolysable group, m is from 2 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (II) has an average of at least two silicon-bonded hydroxy or hydrolysable groups per molecule, the silicon rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in silicone resin (II) is from 0.01 to 1.5.

6. The reinforced silicone resin film according to claim 1, wherein at least one of the polymer layers comprises a carbon nanomaterial selected from carbon nanoparticles, fibrous carbon nanomaterials, or layered carbon nanomaterials.

7. The reinforced silicone resin film according to claim 1, wherein at least one of the polymer layers comprises a reinforcement selected from a carbon nanomaterial, a fiber reinforcement, or a mixture thereof.

8. A reinforced silicone resin film comprising:
   a first polymer layer;
   a second polymer layer on the first polymer layer; and
   at least one additional polymer layer on at least one of the first or second polymer layers; wherein at least one of the polymer layers comprises a cured product of at least one silicone resin having an average of at least two silicon-bonded hydrogen atoms, hydroxy groups, or hydrolysable groups per molecule, and at least one of the polymer layers comprises a carbon nanomaterial.

9. The reinforced silicone resin film according to claim 8, wherein the first polymer layer, the second polymer layer, and the additional polymer layer each have a thickness of from 0.01 to 1000 μm.

10. The reinforced silicone resin film according to claim 8, wherein the film comprises three polymer layers.

11. The reinforced silicone resin film according to claim 8, wherein the silicone resin has the formula $(R^1R^2{}_2SiO_{1/2})_w$ $(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, $R^2$ is $R^1$, —OH, or a hydrolysable group, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms, hydroxy groups, or hydrolysable groups per molecule.

12. The reinforced silicone resin film according to claim 8, wherein the silicone resin is a rubber-modified silicone resin prepared by reacting an organosilicon compound selected from (i) a silicone resin having the formula $(R^1R^4{}_2SiO_{1/2})_w$ $(R^4{}_2SiO_{2/2})_x(R^4SiO_{3/2})_y(SiO_{4/2})_z$ (II) or (ii) hydrolysable precursors of (i), and a silicone rubber having the formula $R^5{}_3SiO(R^1R^5SiO)_mSiR^5{}_3$ (III) in the presence of water, a condensation catalyst, and an organic solvent to form a soluble reaction product, wherein $R^1$ is $C_1$ to $C_{10}$ hydrocarbyl or $C_1$ to $C_{10}$ halogen-substituted hydrocarbyl, $R^4$ is $R^1$, —OH, or a hydrolysable group, $R^5$ is $R^1$ or a hydrolysable group, m is from 2 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (II) has an average of at least two silicon-bonded hydroxy or hydrolysable groups per molecule, the silicon rubber (III) has an average of at least two silicon-bonded hydrolysable groups per molecule, and the mole ratio of silicon-bonded hydrolysable groups in the silicone rubber (III) to silicon-bonded hydroxy or hydrolysable groups in silicone resin (II) is from 0.01 to 1.5.

13. The reinforced silicone resin film according to claim 8, wherein at least one of the polymer layers comprises a carbon nanomaterial selected from carbon nanoparticles, fibrous carbon nanomaterials, or layered carbon nanomaterials.

* * * * *